_United States Patent_ [19]

Sargent

[11] 3,724,397
[45] Apr. 3, 1973

[54] ENDLESS TRACK VEHICLES
[76] Inventor: Freeman E. Sargent, Old Chesterfield Road, Winchester, N.H. 03470
[22] Filed: Aug. 2, 1971
[21] Appl. No.: 168,264

Related U.S. Application Data

[62] Division of Ser. No. 840,801, July 10, 1969, abandoned.

[52] U.S. Cl. ................................180/9.54, 305/29
[51] Int. Cl. .............................................B62d 55/00
[58] Field of Search.......180/617, 6.48, 6.5, 9.5, 9.52, 180/9.54, 9.56, 9.58; 280/28.5, 104 R, 104.5 R; 305/29

[56] References Cited

UNITED STATES PATENTS 1,482,726   2/1924   Best..................................305/29 X
3,601,210   6/1969   Stedman..............................180/6.7

Primary Examiner—Benjamin Hersh
Assistant Examiner—John A. Pekar
Attorney—Robert E. Meyer et al.

[57] ABSTRACT

An endless track vehicle, including a frame, a body on the frame, a pair of endless tracks, independently operated, so that each track can operate at varying speeds, and even in reverse to one another, a closed hydraulic system including connecting pipes to and from a fluid tank, an hydraulic pump, driving fluid to two two-way hydraulic control valves leading to two reversible hydraulic motors each separately driving a track, a gasoline powered engine having a shaft attached to the crankshaft.

A modification includes the same mechanism in which the body is divided into two separate longitudinal sections, each supporting an endless track, and is connected by independent suspension means so that each track is independently mounted to permit the track to separately conform to irregularities in the terrain.

3 Claims, 10 Drawing Figures

PATENTED APR 3 1973 3,724,397

INVENTOR
FREEMAN E. SARGENT

BY,
Porter & Meyer
ATTORNEYS

PATENTED APR 3 1973

INVENTOR
FREEMAN E. SARGENT

BY,

Porter & Meyer

ATTORNEYS

INVENTOR
FREEMAN E. SARGENT
BY,
*Porter & Meyer*
ATTORNEYS

ENDLESS TRACK VEHICLES

This is a divisional application of my application Ser. No. 840,801, filed July 10, 1969 (now abandoned).

SUMMARY OF THE INVENTION

This invention relates to Endless Track Vehicles which when driven on land are generally known as Military Tanks, Tractors or Landmobiles and when driven on snow are generally known as Snowmobiles and particularly to an endless track vehicle driven by an hydraulic motor mechanism.

Briefly, my invention comprises a double endless track vehicle, driven by an hydraulic power system having control means for driving said endless tracks independently and at varying speeds relative to each, and in reverse directions.

My invention also comprises, as a modification, the same double endless track vehicle driven by an hydraulic power system, in which the two endless tracks are independently mounted and suspended, and while held in parallel relation are provided with means permitting relative tilting movement between the two endless tracks, longitudinally and transversely of each other.

The advantages of my vehicle are many:

1. It can turn around in its own length, by reversing one track while the other is going forward;
2. Many moving wearable and breakable parts are eliminated, including gears, belts and chains;
3. It can travel equally well on snow, dry land, sand, mud, shallow water, uneven terrain and cross-country, without change of mechanism, which makes it a year-round vehicle;
4. Its uses are equally voluminous and include travel on snow and ice, on irregular terrain up-hill, down-hill and cross-country, by hunters, game wardens and police, conservationists in spring, summer and fall, in forests where trees are spaced as much as 4 feet apart, as a golf cart, a beach buggy, and the like;
5. Skis are eliminated for steering, which makes turn-arounds on a short radius possible;
6. Power take-offs can be provided for attachments, such as mowers, cutter-bars for brush, garden implements, such as tillers, snow-blowers, and the like;
7. In the modification of my device, shown in FIGS. 5 to 10, the two separate endless tracks are in effect individually suspended, both front and rear, and laterally, thereby providing a more uniformly even ride, despite unevenness of the terrain.

These and other objects of the invention will be better understood from the detailed description which follows and from the drawings:

REFERENCE TO THE DRAWINGS:

DETAILED DESCRIPTION

Figure 1:
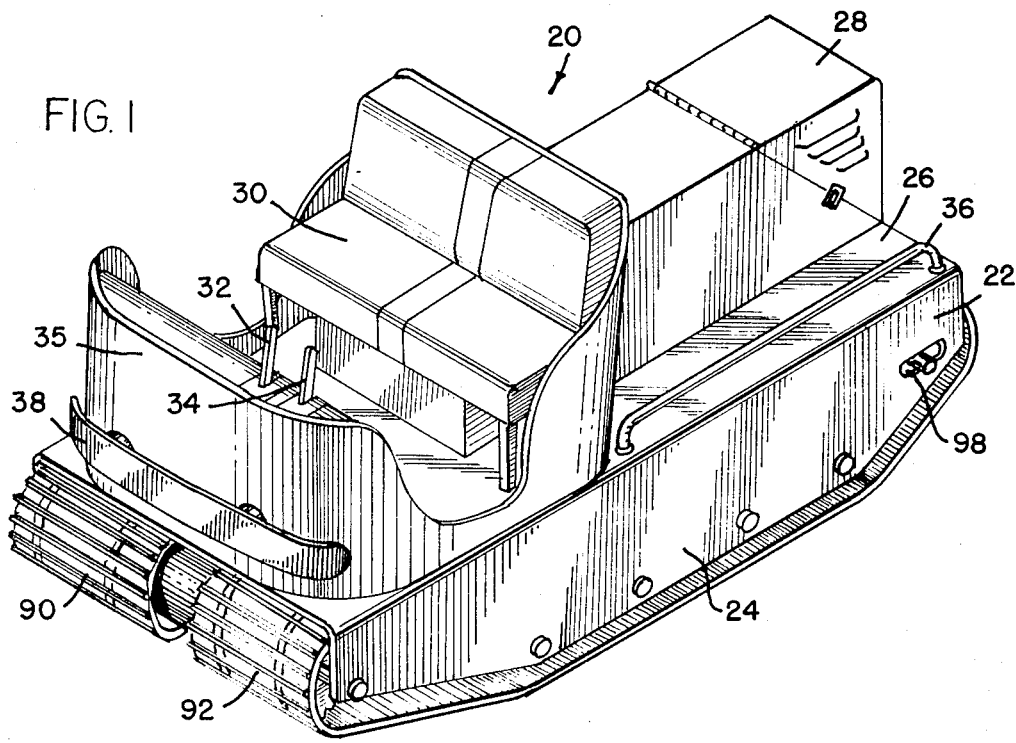
FIG. 1 is a perspective view of my vehicle.

Referring to FIG. 1, 20 represents my vehicle in general, which includes the frame 22, the body or chassis 24 (best seen in FIG. 2), the platform 26, on which is fixedly mounted a casing 28 (which encloses the hydraulic power system, later referred to) the front seats 30 on either of which the driver can sit to handle the hydraulic control handles 32 and 34 for the two endless tracks, and the cowling or panel 35. On the inside of the cowling 35 instruments are mounted, such as heat and pressure gauges, a gasoline gauge, light switches, and the like (not shown). A side rail 36 is provided on the two sides of the platform (FIG. 1) and a leaf spring bumper 38 on the front of the cowl or panel 35, and it is understood that headlights (not shown) may be provided on the front panel 35, if desired. Additional padded seats and handles (not shown) can be provided on top of the casing 28, if desired.

Figure 2:
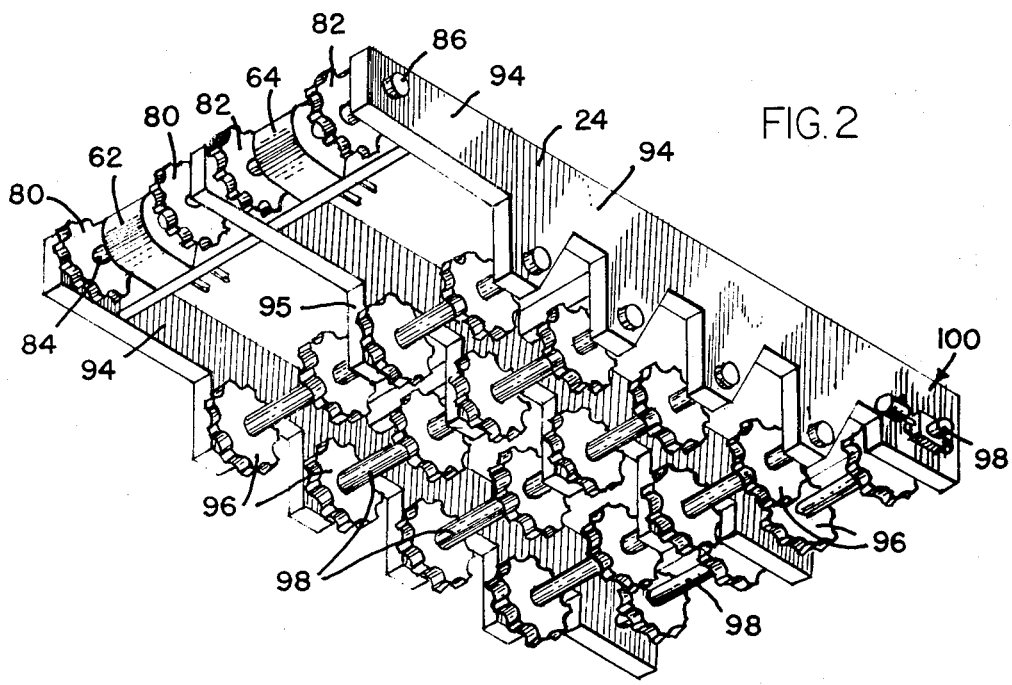
FIG. 2 is a detailed view of the frame and underbody looking upward.
Figure 3:
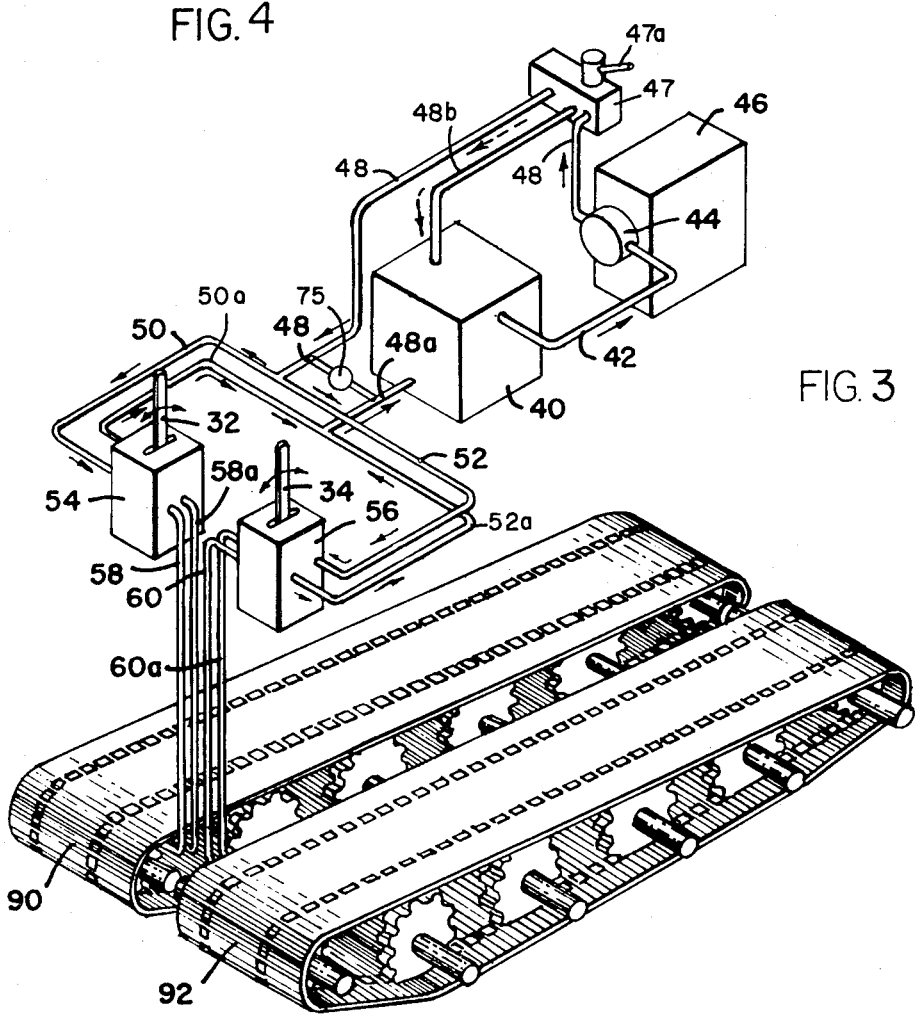
FIG. 3 is a diagrammatic sketch showing the driving and power mechanism and endless tracks of my vehicle.

The body or chassis 24 provides the carriage which mounts and supports the hydraulic system and the endless tracks, and includes the flat platform 26. On the platform 26, the hydraulic system is mounted, which includes the hydraulic fluid tank 40 (FIG. 3) designed to withstand a pressure of 1,000 pounds, circulating pipe 42 carrying the fluid to the rotary hydraulic pump 44, in turn driven by the gasoline motor 46 of conventional type, (preferably of 15 to 20 hp). Pipe 48 carries the hydraulic fluid from the pump 44, which branches at point T to carry the fluid through pipes 50 and 52 respectively, through hydraulic control valves 54, 56 and thence through the pipes 58 and 60 to the two reversible hydraulic motors 62 and 64 of conventional type, which are supported on the under side of body 24 at its front end, (best shown in FIG. 2) and hence to drive the two endless tracks 90 and 92. Return flow pipes, paralleling the forward flow pipes, marked 58a, 60a, 50a, 52a and 48a return the hydraulic fluid to the tank 40. Naturally the direction of flow of fluid through the pipes 58 and 58a, 60 and 60a to the fluid motors 62 and 64 is reversed when the control valves 54 and 56, through manual control levers 32 and 34 are reversed to either hydraulic motor 62 or 64. A by-pass or throttle valve 47 is also provided on pipe 48, and by-pass pipe 48b runs from valve 47 to the fluid tank 40. In its open position by-pass valve 47 serves to confine or short circuit the flow of hydraulic fluid between pump 44 and tank 40, for starting the motor 46, and prevents forcing the fluid through the entire hydraulic system, thus relieving the load on motor 46 in starting. As noted, bypass or throttle valve 47 is provided with handle 47a, and when closed gradually after starting motor 46, the hydraulic fluid circulates gradually throughout the hydraulic system. By closing valve 47 entirely, fluid is forced throughout the hydraulic system, and speed and direction are controlled thereafter by valve 47 and levers 32 and 34. A pressure relief valve 75 is provided on pipes 48 and 48a (FIG. 3). As the hydraulic system itself is old and of conventional type, it is unnecessary to describe and to show pump 44, gasoline motor 46, control valves 54 and 56 and the hydraulic motors 62 and 64 in detail or to describe its operation in detail.

In operation, gasoline motor 46 drives pump 44 to force the hydraulic fluid, usually oil, at great pressure through the hydraulic system, including control valves 54 and 56 to drive the fluid motors 62 and 64 and hence the tracks in a forward direction. Steering is done by increasing the speed of flow of fluid to one motor 62 or to the other motor 64, through the control valves 54 or 56, and turning around within its own length can be accomplished by going forward with one track 90 or 92, and in reverse with the other track. Naturally the radius of the turning circle depends on the relative rate of speed of the two endless tracks 90 and 92, if both are going forward. When the control handles 32 and 34 are moved to their neutral position, no power is provided to the tracks 90 and 92 and it will be understood that this thus provides a braking action to one or both tracks of the vehicle.

Figure 4:
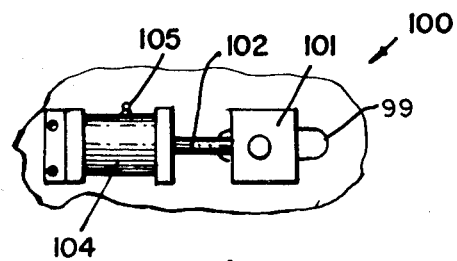
FIG. 4 is a perspective view of the take-up device for the endless tracks.

The two hydraulic motors 62 and 64 are supported on the underside and at front end of body 24, as previously stated, and are of the conventional blade or impeller type, in which fluid under great pressure is forced against the blades, in either a forward or rearward direction, to rotate the rotors in a forward or rearward direction, as controlled by the operator through levers 32 and 34 of the control valves 54 and 56. The two hydraulic motors form part of, and drive the pair of driving sprockets 80 which in turn drive the right hand track 90, and the pair of driving sprockets 82, which drive the left hand track 92 (FIG. 2). Driving sprockets 80 are fixedly mounted on the axle 84, and driving sprockets 82 are similarly mounted on the separate axle 86, the axles being in axial relation to each other but separate and independent. Body or chassis 24, in addition to the platform 26, includes two longitudinal side panels or beams 94, which with central panel or beam 95 form an under carriage for mounting the sprockets and the two endless tracks 90 and 92. The sprockets include, in addition to the front pair of driving sprockets 80 and 82, two series of 5 pairs of idler sprockets 96, rotatably mounted in tandem in bearings provided in longitudinal panels 94 and 95 behind the driving sprockets 80 and 82, and each pair of idler sprockets 96 being mounted on its own separate axle 98. It will be understood that the idler sprockets 96 can be idler wheels, but that sprockets are regarded as preferable because of their automatic action in cleaning the tracks 90 and 92 of accumulated snow, mud, dirt, grass or debris. The tracks 90 and 92 are of course provided with suitable openings to mesh with the sprockets 80, 82 and 96. The first four pairs of idler sprockets 96 are journalled in fixed bearings in panels 94 and 95. But the rear pair of idler sprockets are slidably mounted in a horizontal slot 99 and take up means 100 is provided (FIGS. 2 and 4) for taking up any slack that may occur in the endless tracks 90 and 92. As shown in more detail in FIG. 4, this means 100 includes a bearing block 101 slidable in slot 99 with rod 102 movably connected to hydraulic cylinder 104, with grease fitting 105. It will be understood that when slack is to be taken up in endless tracks 90 and 92, grease will be supplied under heavy pressure to cylinder 104 through fitting 105, whereby bearing block 101 will be forced rearwardly to thus take up any slack in the tracks.

It will thus be seen that I have provided an endless track vehicle driven by an hydraulic motor system with two independently driven reversible endless tracks, each driven from one hydraulic power system, and having manual controls for driving each track at varying rates of speed both forwardly and rearwardly, to steer the vehicle to turn it around within its own length, and thus providing many advantages over existing vehicles.

In FIGS. 5 to 10 inclusive, I have shown a modification of my invention, whereby in effect I have provided an independent suspension of each endless track, both longitudinally and transversely, to compensate for irregularities in the terrain to dampen bumps and jouncing and thus provide a more even and uniform ride over rough ground.

Figure 5:
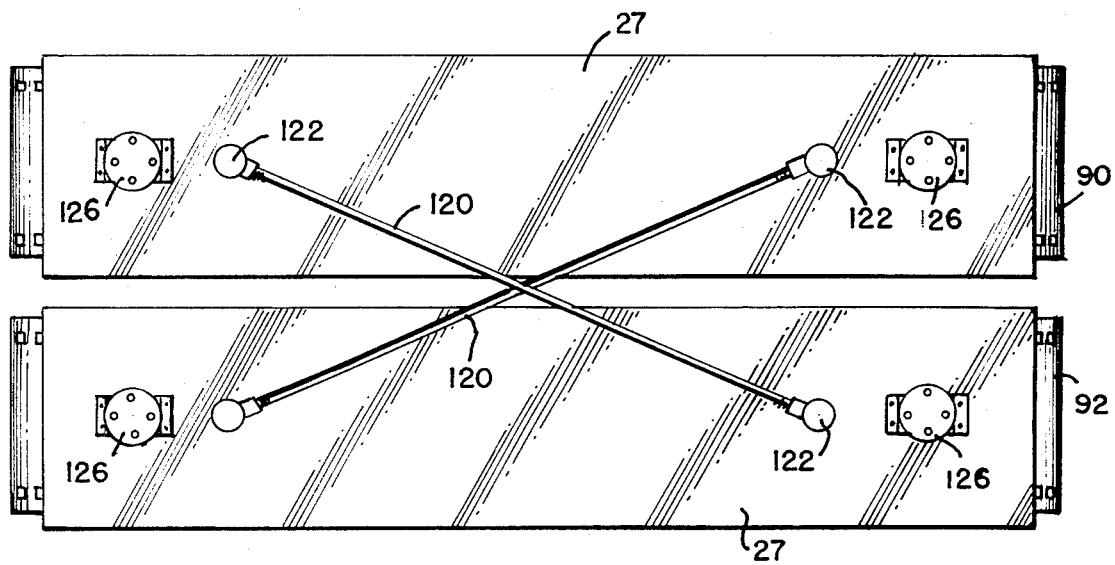
FIG. 5 is a plan view of a modification of my vehicle with the platform and superstructure removed.
Figure 6:
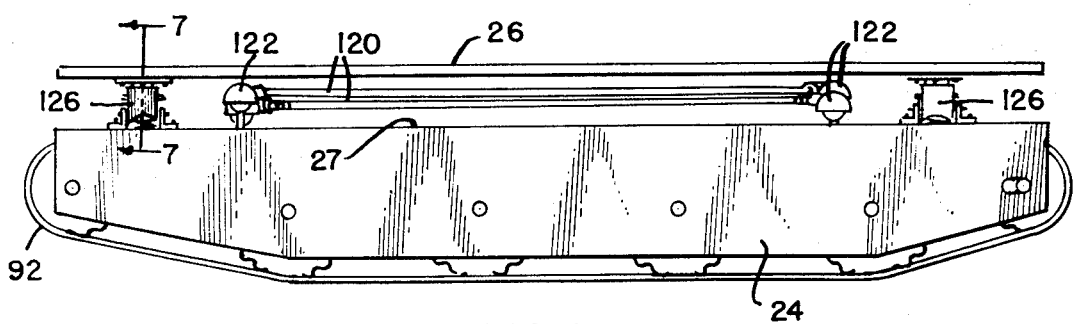
FIG. 6 is a side elevation of my vehicle as shown in FIG. 5 with the platform shown and superstructure removed.
Figure 7:
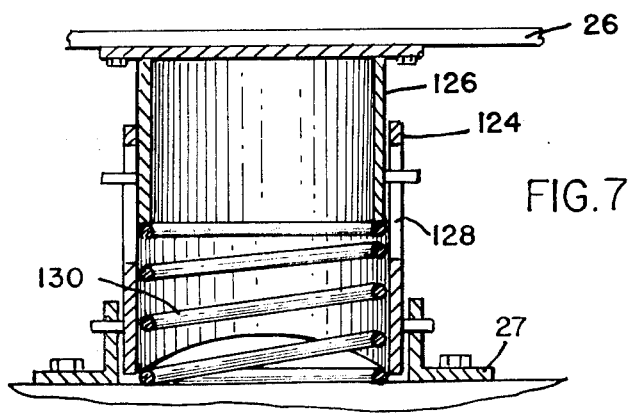
FIG. 7 is a vertical section on line 7—7 of FIG. 6 showing the shock-absorber.
Figure 8:
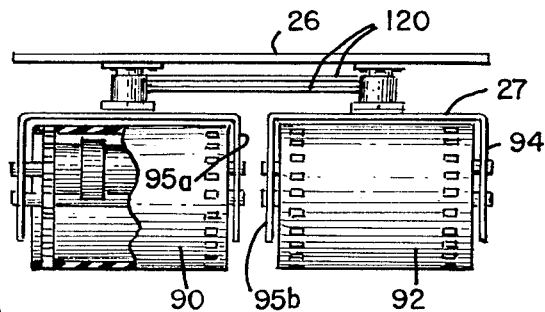
FIG. 8 is a front elevation of my vehicle as shown in FIG. 6 with the platform shown and superstructure removed.
Figure 9:
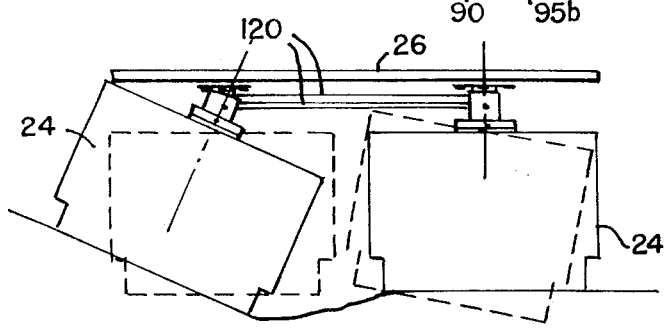
FIG. 9 is a front elevation as in FIG. 8 showing the transverse tilting ability of the endless tracks of the modification as shown in FIG. 5.
Figure 10:
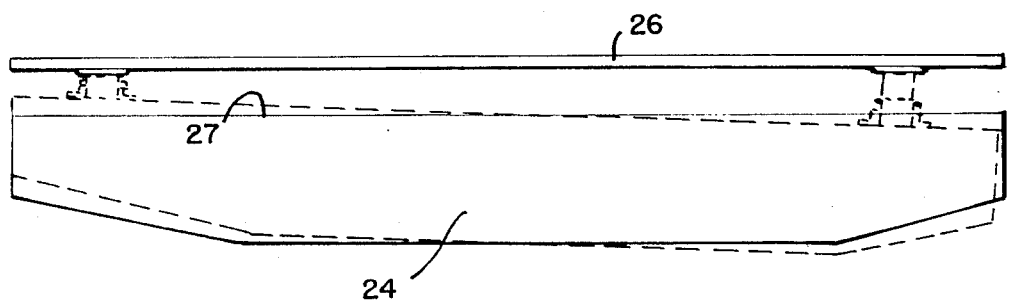
FIG. 10 is a side elevation of the modification of my vehicle as shown in FIG. 5, showing the longitudinal tilting ability of the endless tracks.

The mechanism includes the platform 26 on which the hydraulic power system is mounted, as described above as to FIGS. 1, 2 and 3, and in addition a separate floor 27 is provided for each endless belt under the platform 26, each endless belt system being separately and independently mounted in its own body or chassis 24. Thus body or chassis 24 herein is divided longitudinally into two separate halves, each carrying its own tracks 90 and 92 and sprockets and with middle panel 95 now being two separate panels 95a and 95b (FIG. 8), in which the sprocket axles for each track are separately mounted. The two endless tracks 90 and 92 are connected together by two rigid crossing arms or bars 120 (FIG. 5), which serve to maintain the two endless tracks in parallel alignment, yet permit each track to move relatively upwardly or downwardly with respect to the other track. To permit this motion, the two cross bars 120 are each mounted at their ends in ball joints 122, in turn fixedly mounted on the floor 27 of each endless track (FIGS. 5 and 6). In addition, each endless track is separately mounted in its own separate chassis 24 with two separate coil springs 124 at the front and rear ends respectively, between the platform 26 and its own floor 27 (FIGS. 5, 6 and 7). The coil spring mounting, generally indicated at 124, includes an upper telescoping cylinder 126 relatively vertically movable into the lower cylinder 128. Upper cylinder 126 is mounted on the underside of platform 26, and lower cylinder 128 is mounted on the top side of floor 27 of each endless track system, with the motion between the two cylinders controlled by the coil spring 130, weighted to flex at approximately 600 pounds thrust. In this manner, the two endless tracks 90 and 92 are permitted to tilt upwardly or rearwardly with respect to one another, as indicated in FIG. 10, or to tilt transversely or laterally with respect to one another, as shown in FIG. 9. The longitudinal movement of the two endless tracks 90 and 92 with respect to each other is of course limited by the permissible relative movement of cylinders 126 and 128, and transversely by the underside of platform 26, and the cross-bars 120, as shown in FIG. 9.

It will thus be seen that in the modification shown in FIGS. 5 to 10 inclusive, I have provided an endless track vehicle, powered by an hydraulic motor system, with two independently driven reversible endless tracks, each of which is independently suspended to permit relative longitudinal and transverse tilting movement between the two endless tracks and thus to compensate for irregularities in the terrain.

It will be apparent that variations may be made in my invention, and I do not limit my invention to the structure shown, beyond the requirements of my appended claims.

I claim

1. In an endless track vehicle having a pair of endless tracks mounted in parallel alignment, means permitting relative tilting movement between the two endless tracks both longitudinally and transversely of each other, including a pair of rigid cross bars diagonally connecting each said endless track system, one said cross bar connecting the forward end of a first said endless track system to the rearward end of the second said endless track system and the other said cross bar connecting the forward end of the second said endless track system to the rearward end of the first endless track system.

2. An endless track vehicle as in claim 1, in which the rigid cross bars diagonally connecting each endless track system are mounted at their ends in ball-joint suspensions.

3. An endless track vehicle as in claim 1, in which the means permitting relative tilting movement between the two endless tracks includes coil spring suspensions at the front and rear ends of said endless track systems.

* * * * *